Figure 1:
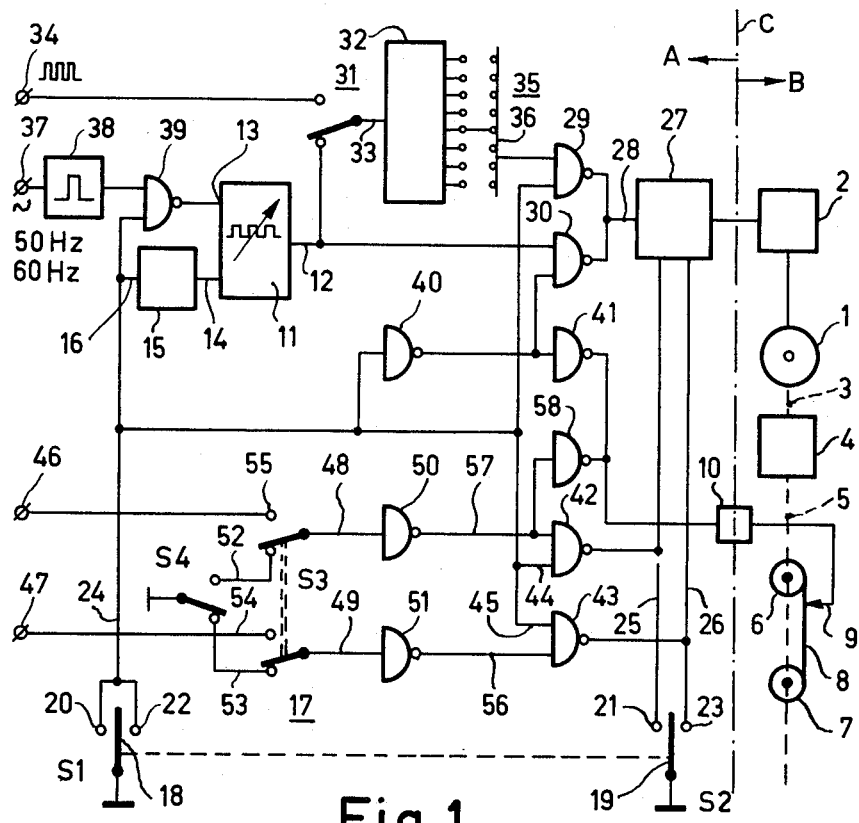

United States Patent [19]

Sijtstra et al.

[11] 3,982,166

[45] Sept. 21, 1976

[54] CONTROL UNIT FOR PAPER TRANSPORT

[75] Inventors: Sebastianus Sijtstra; Willem Boom, both of Almelo, Netherlands

[73] Assignee: U.S. Philips Corporation, New York, N.Y.

[22] Filed: Apr. 12, 1974

[21] Appl. No.: 460,281

[30] Foreign Application Priority Data

Apr. 16, 1973 Netherlands............... 7305266

[52] U.S. Cl.............................. 318/696; 318/440; 318/597
[51] Int. Cl.²......................................... H02K 37/00
[58] Field of Search........... 318/696, 685, 596, 597, 318/440, 341

[56] References Cited
UNITED STATES PATENTS

| | | |
|---|---|---|
| 3,458,786 | 7/1969 | Thompson ........................... 318/597 |
| 3,467,899 | 9/1969 | Inaba et al. ......................... 318/696 |
| 3,619,757 | 11/1921 | Ioerger ............................... 318/597 |
| 3,777,246 | 12/1973 | Barnes ................................. 318/696 |

Primary Examiner—Gene Z. Rubinson
Attorney, Agent, or Firm—Frank R. Trifari; Bernard Franzblau

[57] ABSTRACT

For recording instruments fed from a 50 Hz or 60 Hz supply mains it is proposed to use a control unit of substantially entirely digital structure for the transport of the record carrier, for example paper, with the use of a stepping motor. A simple 300 Hz or 600 Hz oscillator which is synchronized with the mains and a frequency divider enable various paper speeds to be set, slow or fast paper transport for adjusting purposes being simply realized by controlling the frequency of the oscillator. Several functions can be remotely controlled.

10 Claims, 2 Drawing Figures

CONTROL UNIT FOR PAPER TRANSPORT

The invention relates to a control unit for paper transport in recording instruments which are fed from a 50 or 60 Hz line voltage supply, which unit comprises a controllable oscillator to which a motor supply circuit is connected which feeds a stepping motor the shaft of which is coupled to a transmission member for driving a paper transport roller.

In recording instruments generally a quantity which varies with time is drawn in the form of a curve on recording paper which moves at a uniform speed. In most cases the quantity, which may be of electric, mechanical or pneumatic nature, is converted into a voltage or current which is supplied to a servo system to move a pen or stamp printer to a position which is related to the amplitude of the quantity to be displayed. The pen or printer provides a mark on the recording medium which moves with respect to the pen or printer, for example in proportion with time. Also, it may be desirable in the case of a non-linear time function for the recording paper transport to be adjustable.

For driving the paper transport roller it is known to use a synchronous motor which is fed from the public supply lines the frequency of which is fairly constant. To enable the paper speed to be adjusted in various discrete steps a variable-ratio gearbox is interposed between the motor shaft and the paper roller. Depending upon the supply frequency, which may be 50 or 60 Hz, and upon the desired speed ratios, various gearboxes are available. Furthermore mechanical coupling is required between a setting button on the instrument panel and the gearbox for selecting the desired speed, and the manufacturer is restricted in his choice of the locations of the various instrument components in the case of the recorder. Manual adjustment of the paper generally is effected by rotating the paper roller. Fast transport of the paper, both forward and reverse, and remote control of all the above settings are hardly possible.

An improvement is obtainable by replacing the synchronous motor by a stepping motor which drives the paper roller via a fixed gearing, for example a worm-and-wheel gear. The fixed gear ratio is selected so that one step of the motor shaft provides a small displacement of the paper, for example 50 microns, so that the paper motion appears to be substantially continuous. The stepping motor can be fed by an oscillator of adjustable frequency. Programming of the desired paper speed can then be effected by electronic means with the aid of setting switches on the control panel or via analog or digital remote control.

It is an object of the present invention to further improve a control unit for paper transport with the use of a stepping motor. For this purpose a control unit according to the invention is characterized in that it includes a change-over switch for normal-speed and fast paper transport, in the normal-speed position of which the oscillator has a frequency of substantially $n$ times 300 Hz, where $n$ is an integer. A synchronizing input of the oscillator is connected to a supply frequency pulse shaper while an output of the oscillator is connected to a paper speed selection switch and to the motor supply circuit. In the fast paper transport position of the switch the oscillator is connected to a clock (i.e. timing) circuit which when actuated provides a time-variable signal for controlling the oscillator frequency from a low value to a high value, the output of the oscillator being directly connected to the motor supply circuit.

The advantages of such a control unit are:

the oscillator has a fixed frequency which is in synchronism with the supply voltage, which may have a frequency of 50 Hz or 60 Hz, without special mechanical or electronic switching operations being required, and furthermore the oscillator may be of simple nature because the frequency stability is determined by the supply frequency;

by the use of known electronic frequency dividers any desired division and hence any paper speed is obtainable, for example ratios of 1, 2 and 5 per decade over four decades, a change-over from unit length per minute to unit length per hour, that is by a factor of 60, change-over from the metric system to the imperial system (inches), while there may be connected to the dividers external pulse sources the frequencies of which may vary so that triggering by an external process may be effected;

manual transport of the paper may simply take place by means of a resilient free-position switch which when briefly energized either provides slow forward or reverse transport for correct start positioning and on prolonged energisation provdes fast forward or reverse transport of the paper.

Figure 2:
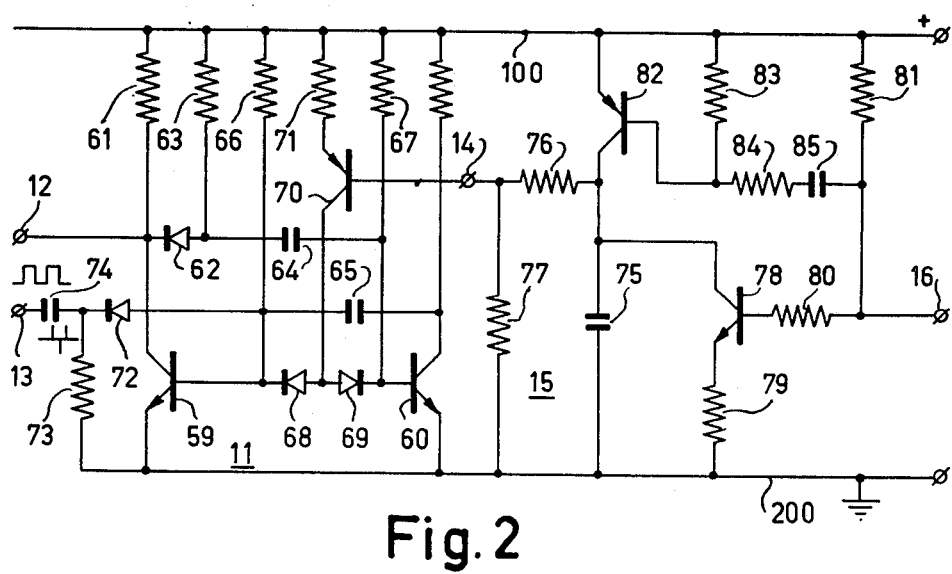

An embodiment of the invention will now be described, by way of example, with reference to the accompanying diagrammatic drawings, in which:

FIG. 1 is a block diagram of part of a recording instrument provided with a control unit according to the invention, and FIG. 2 is an embodiment of the oscillator for use in a control unit according to the invention.

Referring now to FIG. 1, the diagram is divided in two parts: an oscillator situated on a side A of a dividing line C, and a motor part for paper transport situated on a side B of the line C. The motor part B comprises a stepping motor 1 which is fed from a conventional motor supply circuit 2 with pulses so that its shaft 3 revolves in steps. One suitable form of motor supply circuit is shown in FIG. 22 of the booklet, "Philips Stepping Motors" published in Holland in 1965 under the code number 32.087 B/E 12-'64. The shaft is coupled to a transmission 4 in the form of a gearbox or a worm-and-wheel gearing, the output shaft 5 of which is coupled to paper rollers 6 and 7 to move a strip of paper 8 below a pen 9. The pen 9 is adjusted transversely of the direction of movement of paper by a servo system which is controlled by the quantity to be displayed. Such a servo system is known and hence is not shown in the Figure. The pen 9 is connected in a manner symbolically shown to a pen lifting device 10 required to lift the pen clear of the paper if desired, for example when a new reel of paper is mounted, when changing over to other measuring channels and when changing over to fast paper transport. The controllable oscillator A comprises an oscillator 11 which delivers a sine-wave or square-wave voltage at an output 12 and is controlled at a synchronizing input 13 or at an input 14 which is connected to a clock circuit 15 having an inhibiting input 16.

A change-over switch 17 has two mechanically coupled sections $S_1$ and $S_2$ which each are provided with a contact 18 and 19 respectively which are shown in the neutral position "normal" which they always occupy when the switch is not operated. The switch section $S_1$ has two make contacts 20 and 21 which are interconnected and which impart to a line 24, which has a "high" potential in the "normal" position of the switch, a "low" potential when the switch 17 is set to the position for fast paper transport. The paper is fed forward in one of the positions 20 and 22 and is reversed in the other position. The particular position is determined by the switch section $S_2$ which has corresponding make contacts 21 and 23 which are connected via control lines 25 and 26 respectively to a logic control unit 27. Unit 27 controls the supply circuit 2 so that the energizing coils of the motor 1 are supplied in the desired manner, the stepping motor 1 turning the shaft 3 in steps either forward or in the reverse direction, as determined by a low level on the line 26 or on the line 25 respectively. The control pulses for the motor 1 are applied to an input 28 of the logic control unit 27 by the oscillator 11 either directly via a NAND gate 30 or via a NAND gate 29 and a conventional frequency divider 32. The unit 27 may comprise a pair of NAND gates similar to NAND gates 42 and 43 wherein a first input of each gate is connected together and to the pulse input line 28. A second input of one NAND gate is connected to line 25 and the second input of the other NAND gate is connected to line 26. The output terminals of the NAND gates are connected to respective first and second inputs of motor supply circuit 2 which produce clockwise and counterclockwise rotation of the motor dependent on the position of contact 19 of switch section S2. The basic control pulses for the divider 32 are received at an input 33 via a switch 31 either from the output 12 of the oscillator 11 or from an external source which may be connected to a terminal 34. The divided outputs of the divider 32 may each be connected to a selection switch 35 the common contact 36 of which is connected to a first input of the gate 29. Thus a frequency $f$ of a pulse train applied to the input 33 may be divided, for example, by the factors 1, 2, 5, 10, 20, 50, 100, 200, 500, 1000 and 2000. When controlled by the oscillator 11 which provides a frequency of 300 Hz the paper speed may thus range from 1 meter per minute to 0.5 mm per minute. The frequency $f$ of the external source can be varied by the divider 32 from nearly zero, for example one step of the motor 1 per hour, to 600 kHz.

To a terimal 37 of the controllable oscillator A a voltage is applied which is derived from the AC supply lines to which the recording instrument is connected. This AC supply may have a frequency or 50 of 60 Hz. The voltage is converted by a frequency pulse shaper 38 into a square-wave voltage of the same frequency which is applied to an input of a NAND gate 39 the output of which is connected to the synchronizing input 13 of the oscillator 11. When the voltage level on the line 24 is high, the clock circuit 15 is cut off and the gate 39 passes synchronizing pulses so that in the case of a 50 Hz supply the oscillator 11 runs free for 5 oscillations and is synchronized at the sixth, whereas in the case of a 60 Hz supply it runs free for 4 oscillations and is synchronized at the fifth. When the voltage level on the line 24 is low the clock circuit 15 starts and the gate 39 is closed. The gate 29 operates in the same manner as the gate 39. The NAND gate 29 passes the pulses from the divider 32 when the line 24 is high, because its other control input is connected to the line 24. Since the gate 30 has its other input connected to the line 24 via an inverter 40, the gate 30 is closed. At a low level on the line 24 the gate 29 is closed and the gate 30 is open. In this case there is fast paper transport so that it is desirable for the pen or the stamp mechanism 9 to be lifted from the paper. For this purpose the pen lifting device 10 is energized by a low level from an inverter 41 which is also connected to the output of the inverter 40.

FIG. 1 also shows a possibility of "forward" or "reverse" paper transport at a rate determined by the source connected to the terminal 31 or by the oscillator 11 in conjunction with the divider 32, either internally by means of a switch $S_4$ or externally via a switch $S_3$. For this purpose the lines 25 and 26 are connected to the outputs of NAND gates 42 and 43 respectively. An input 44 of the gate 42 and an input 45 of the gate 43 are connected to the line 24 so that these gates allow the passage of signals applied to their other inputs when the line 24 is high but are closed when the line 24 is low, the outputs of the gates 42 and 43 being high so that the low level of the switch $S_4$ predominates.

A double-pole double-throw switch $S_3$ is connected by one output line 48 via an inverter 50 to the other input of the gate 42 and by its other output line 49 via an inverter 51 to the other input of the gate 43. In the "internal" position shown the line 48 is connected by a line 52 to one contact of the switch $S_4$ and the line 49 is connected by a line 53 to the other contact of $S_4$. The center contact of $S_4$ is connected to ground to enable a low control level to be maintained either on the line 52 or on the line 53, which latter condition is shown. When the switch $S_3$ is in the "external" position the line 48 is connected to the line 55 and hence to the terminal 46, while the line 49 is connected to the line 54 and hence to the terminal 47. Applying a low level to one of the terminals 46 or 47 represents a control signal. In the positions shown of $S_3$ and $S_4$ the lines 53 and 49 are low, which means that the line 56 between the inverter 51 and the gate 43 is high. The input 45 is high so that the line 26 is low, resulting in forward transport of the paper. The line 48 is high so that a line 57 between the inverter 50 and one input of the gate 42 is low. Because the input 44 is high and the state of a NAND gate is determined by a low level, the line 25 will be high. The low level of the line 57 is converted by an inverter 58 to a high level and, since the output of the inverter 41 also is high, the pen lifting device is not actuated and the pen writes on the paper. Consequently the position shown of $S_4$ is the forward position. In the other position, the reverse position, the lines 52 and 48 are low and the line 57 is high, the line 25 is low and the paper is transported in the reverse direction. Furthermore an inverter 58 will produce a low level so that the pen 9 is lifted from the paper, as is desirable during reverse transport of the paper. The line 49 now is high, the line 56 is low and hence the line 26 is high.

In the embodiment shown in FIG. 1 digital modules such as NAND gates 39, 29, 30, 42 and 43 and inverters 40, 50, 51, 41 and 58 are used. Obviously the inverters may be replaced by NAND gates having interconnected inputs. NAND gates are assumed to be known and their operation has been described above. It will be clear that other logic circuits may be used while maintaining the operation described. A frequency divider and a pulse frequency divider also are assumed to be known and hence are not discussed more fully.

FIG. 2 shows an oscillator provided with a clock (timing) circuit as preferably used in the control unit of the invention.

The oscillator 11 is an astable multivibrator comprising transistors 59 and 60. The collector circuit of the transistor 59 comprises a resistor 61 connected in parallel with a diode 62 and a resistor 63. The collector of the transistor 59 is connected to the output 12 of the oscillator 11. One timing capacitor 64 is connected between the junction of the diode 62 and the resistor 63 and the base of the transistor 60, while the other timing capacitor 65 is connected between the collector of the transistor 60 and the base of the transistor 59. The capacitors have the following discharge circuits: the base of the transistor 59 is connected by way of a resistor 66, and the base of the transistor 60 is connected by way of a resistor 67, to one supply rail 100. The resistors have substantially equal values. They are connected in parallel with a current supply circuit comprising a transistor 70 and its emitter resistor 71 which is connected to the supply rail 100. The current from this supply source is supplied from the collector of the transistor 70 via a diode 69 to the base circuit of the transistor 60 when the latter is cut off, and is supplied via a diode 68 to the base circuit of the transistor 59 during the half cycle in which the transistor 59 is cut off. Thus, by controlling the base of the transistor 70 the frequency of the astable multivibrator can be controlled. For triggering purposes the base of the transistor 59 has applied to it inhibiting needle pulses from a differentiating circuit comprising the series combination of a diode 72 and a resistor 63 connected in parallel with the base emitter circuit of the transistor 59 and a capacitor 74 connected between the junction of the diode and the resistor and the terminal 13. A squarewave voltage derived from the AC supply voltage is applied to the terminal 13. In this case the negative-going needle pulse produced by the differentiating circuit 74 – 73 is passed by the diode 72 and will cut off the transistor 59 if the latter is conducting.

The frequency of the oscillator 11 is determined by the current supplied by the current supply circuit 71 – 70, and this in turn depends upon the voltage at the terminal 14 to which the clock (timing) circuit 15 is connected. The voltage at the terminal 14 is determined by the voltage across a capacitor 75 which is connected through a small limiting resistor 76 between the terminal 14 and a ground line 200.

If the inhibit input 16 is not connected to a low level (that is to ground), see $S_1$ in FIG. 1, the voltage across the capacitor 75 (FIG. 2) is fixed by means of the biassing of a transistor 78. The current supply circuit supplies a current such that the oscillator frequency is about 300 Hz. In the embodiment shown this frequency advantageously is, for example, 285 Hz so that triggering by the synchronizing device 72 – 73 – 74 will take place every 5 or 6 pulses.

The transistor 78 performs three functions. For this purpose its collector is connected to the voltage-carrying terminal of the capacitor 75 to which is also connected the collector of a transistor 82. The emitter of the transistor 78 is connected through an emitter resistor 79 to the ground line 200 and its base is connected through a resistor 80 to the terminal 16 which, through a resistor 81, is connected to the supply line 100. Owing to the voltage divider 81 – 80 – 79 the collector of the transistor 78 has a potential which is nearly equal to its emitter potential. Because the current which flows off through a discharge resistor 77 connected in parallel with the capacitor 75 between the terminal 14 and the ground line 200 is smaller than the current through the resistor 79 by a factor of several tens, the capacitor voltage is determined by the emitter potential of the transistor 79.

When the terminal 16 is connected to ground, the transistor 78 becomes non-conducting and the transistor 82, the emitter of which is connected to the supply line 100, becomes conducting to charge the capacitor 75 to the supply voltage. This charging is of short duration and is determined by a resistor 83 connected between the line 100 and the base of the transistor 82, and by a resistor 84 and a capacitor 85 which are connected in series between the base of the transistor 82 and the terminal 16. Because the resistor 81 has a small resistance, the capacitor voltage of the capacitor 85 is substantially zero when the terminal 16 is not connected to ground, and this capacitor will be charged with a time constant which is mainly determined by elements 84 – 85, the transistor 82 passing base current. As a result of the rapid charging of the capacitor 75 to the supply voltage the transistor 70 is cut off and no current is supplied to the oscillator 11 so that its frequency is determined only by the capacitors 64 and 65 and the base resistors 66 and 67. The frequency will be about 50 Hz, which corresponds to a paper speed of a few mm per second. Using this speed, the paper may readily be moved to a desired position relative to the pen. When the terminal 16 remains connected to ground the capacitor 75 will discharge through the resistor 77 because the transistors 82 and 78 are both cut off. As a result, the current from the source 70 – 71 and hence the frequency of the oscillator and the paper speed will increase. The values of the circuit components can be chosen so that it will take from 3 to 10 seconds for the current source 70 – 71 to supply its maximum current, which is determined by the base current of the transistor 70 which produces the voltage drop across the resistor 77 and hence the discharge limit of the capacitor 75. The frequency of the oscillator now may be 500 Hz so that the paper speed will be a few cm per second. When the connection of the terminal 16 to ground is broken, the transistor 82 remains cut off and the transistor 78 re-adjusts to the original reference voltage and, if the capacitor 75 still has a high voltage due to the fact that the fast transport switch 17 of FIG. 1 has been operated for a short time only, the transistor 78 rapidly discharges the capacitor 75 to the initial reference voltage or, if the switch 17 has been operated for longer than 3 seconds, charges the capacitor 75 to the said voltage because the base collector diode of the transistor 78 passes current. The transistor 78 thus acts a switch: it breaks the circuit or it makes the circuit and then charges to a reference voltage and it provides the reference voltage.

Obviously other clock (timing) circuits may be used to produce a time-variable control voltage for an oscillator.

A control unit according to the invention by its substantially entirely digital structure permits the use of existing cheap modules or even manufacture of the whole unit in integrated circuit form.

What is claimed is:

1. A control unit for paper transport in recording instruments energized from a 50 or 60 Hz AC supply source comprising, a controllable oscillator, a motor supply circuit connected to a stepping motor having a drive shaft for driving a paper roller, a paper speed selection switch coupled to the motor supply circuit, a change-over switch for selectively switching the output of the controllable oscillator to the selection switch and directly to the motor supply circuit to provide normal and fast paper transport speeds, respectively, in the normal paper transport position of the switch the oscillator has a frequency of substantially $n$ times 300 Hz, where $n$ is an integer, means connecting a synchronizing input of the oscillator to the AC supply via a pulse shaper and means including the change-over switch for effectively connecting the oscillator in the fast paper transport position of the change-over switch to a timing circuit, said timing circuit being energized via the change-over switch to produce a time-variable signal for controlling the oscillator frequency from a low value to a high value.

2. A control unit as claimed in claim 1, wherein the oscillator comprises an astable multivibrator including a pair of cross-coupled transistors and time-determining resistance capacitance circuits, a current supply circuit connected to the resistance-capacitance circuit through a diode gate circuit, means connecting the oscillator synchronizing input to a further resistance capacitance circuit, said current supply circuit including a third transistor provided with an emitter resistor and controlled at its base by the voltage across a capacitor, and means for controlling the capacitor voltage to have a fixed value in the normal paper transport position of the change-over switch and to vary exponentially in the fast paper transport position.

3. A control unit as claimed in claim 2, wherein the voltage controlling means adjusts the capacitor voltage so that when the change-over switch is first set to the fast paper transport position the current from the current supply circuit is substantially zero and the frequency of the oscillator is then at a low value and in about three seconds the current increases and the frequency of the oscillator increases to a high value.

4. A control unit for supplying drive pulses to a stepping motor at first and second repetition rates corresponding to first and second respective stepping speeds of the motor and comprising, a frequency controllable oscillator, an output terminal for said drive pulses, means coupling a synchronizing input of the oscillator to a reference source of AC voltage, a timing circuit coupled to the oscillator for controlling the oscillator frequency, switching means having first and second operative states corresponding to said first and second pulse rates, respectively, and means including said switching means for inhibiting the operation of the timing circuit when the switching means is in said first state whereby the oscillator supplies drive pulses to said output terminal at said first rate, said timing circuit being operative in the second state of the switching means to supply a time varying signal for controlling the oscillator frequency to produce pulses at the second repetition rate and independent of the position of the motor drive shaft.

5. A control unit as claimed in claim 4 further comprising pulse frequency varying means for varying the frequency of a series of pulses applied thereto, said switching means including means for selectively coupling the oscillator output to said output terminal via said pulse frequency varying means and directly to the output terminal thereby to provide at the output terminal drive pulses at said first and second repetition rates, respectively.

6. A control unit as claimed in claim 4 wherein the stepping motor is adapted to drive a paper drive wheel of a recording instrument having a stylus, said control unit including means for lifting the stylus from the paper in the recording instrument, and said switching means includes means for energizing the lifting means in the second state of the switching means.

7. A control unit as claimed in claim 4 wherein said switching means includes a gate circuit as part of the synchronizing input coupling means, said gate circuit being closed in the second state of the switching means thereby to isolate the controllable oscillator from said AC reference voltage.

8. A control unit as claimed in claim 4 wherein the oscillator includes a pair of cross-coupled transistors and at least one RC timing circuit coupled thereto, and a controlled current source coupled to said pair of transistors via a diode gate circuit.

9. A control unit as claimed in claim 8 wherein the current source includes a third transistor having a control electrode coupled to the output of the timing circuit, and said timing circuit comprises a capacitor connected to the timing circuit output, a charge circuit for the capacitor including a fourth transistor, and a discharge circuit for the capacitor including a fifth transistor connected across the capacitor and having a control electrode connected to an input terminal for receiving an inhibit signal.

10. A control unit as claimed in claim 9 wherein said timing circuit further comprises, a second discharge circuit for the capacitor, and an RC timing circuit connected to the control electrode of the fourth transistor.

* * * * *